United States Patent
Schulz et al.

(10) Patent No.: US 11,625,782 B2
(45) Date of Patent: *Apr. 11, 2023

(54) APPARATUS AND METHODS FOR IMPLEMENTING CHANGED MONITORING CONDITIONS AND/OR REQUIREMENTS USING DYNAMICALLY-MODIFIABLE CONTROL LOGIC

(71) Applicant: Nasdaq Technology AB, Stockholm (SE)

(72) Inventors: Robert Schulz, Erksineville (AU); Max Roy Prakoso, Haymarket (AU)

(73) Assignee: Nasdaq Technology AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/524,145

(22) Filed: Nov. 11, 2021

(65) Prior Publication Data

US 2022/0067835 A1    Mar. 3, 2022

Related U.S. Application Data

(63) Continuation of application No. 16/782,249, filed on Feb. 5, 2020, now Pat. No. 11,176,613, which is a continuation of application No. 15/933,433, filed on Mar. 23, 2018, now Pat. No. 10,580,073, which is a continuation of application No. 14/295,541, filed on Jun. 4, 2014, now Pat. No. 9,947,048.

(51) Int. Cl.
*G06F 9/44* (2018.01)
*G06Q 40/04* (2012.01)

(52) U.S. Cl.
CPC ................................ *G06Q 40/04* (2013.01)

(58) Field of Classification Search
None
See application file for complete search history.

(56) References Cited

U.S. PATENT DOCUMENTS

| | | |
|---|---|---|
| 5,410,703 A | 4/1995 | Nilsson |
| 7,448,048 B1 | 11/2008 | Nesamoney |
| 7,603,358 B1 | 10/2009 | Anderson |
| 7,657,474 B1 | 2/2010 | Dybala |
| 8,751,372 B1 | 6/2014 | Friedman |

(Continued)

OTHER PUBLICATIONS

U.S. Appl. No. 16/782,249, filed Feb. 5, 2020, Inventor: Schulz et al.

(Continued)

*Primary Examiner* — Christopher Bridges
(74) *Attorney, Agent, or Firm* — Nixon & Vanderhye P.C.

(57) ABSTRACT

A computer-implemented monitoring system receives an input data stream of electronic data messages and processes the input data stream using a current set of computer instructions to determine a monitoring status. In response to receiving information for modifying the current set of computer instructions, the system dynamically modifies the current set of computer instructions using the received information by injecting one or more modifying computer instructions into the current set of computer instructions resulting in a modified current set of computer instructions. The modified current set of computer instructions are executed to generate a new monitoring status for output.

19 Claims, 8 Drawing Sheets

(56) References Cited

U.S. PATENT DOCUMENTS

| | | | |
|---|---|---|---|
| 9,947,048 | B2 | 4/2018 | Schulz et al. |
| 10,580,073 | B2 | 3/2020 | Schulz et al. |
| 2002/0073017 | A1 | 6/2002 | Robertson |
| 2003/0005408 | A1* | 1/2003 | Tumati ............ G06F 8/656 717/110 |
| 2003/0040955 | A1* | 2/2003 | Anaya ........... G06Q 10/0637 705/7.36 |
| 2003/0225672 | A1 | 12/2003 | Hughes, Jr. et al. |
| 2007/0083452 | A1 | 4/2007 | Mayle |
| 2009/0019525 | A1 | 1/2009 | Yu |
| 2012/0078777 | A1 | 3/2012 | Doornebos |
| 2012/0136772 | A1 | 5/2012 | Demirjian |
| 2012/0166327 | A1 | 6/2012 | Amicangioli |
| 2013/0232018 | A1 | 9/2013 | Keithley |
| 2013/0297475 | A1 | 11/2013 | Sen |
| 2015/0356675 | A1 | 12/2015 | Schulz |

OTHER PUBLICATIONS

Office Action dated Feb. 3, 2021 for U.S. Appl. No. 16/782,249, 14 pages.

NASDAQ OMX | SMARTS Broker, The Complete Compliance Solution for Brokers, 6 pages, downloaded from http://www.nasdaqomx.com/technology/marketplacesolutions/surveillancecompliance, retrieved Jun. 4, 2014.

NASDAQ OMX | SMARTS Integrity, Industry-leading Surveillance Solutions for Marketplace and Regulators, 5 pages, downloaded from http://www.nasdaqomx.com/technology/marketplacesolutions/surveillancecompliance, retrieved Jun. 4, 2014.

FIX Global, Mitigating Market Abuse, vol. 3, Issue 12, Nov. 2012, 3 pages, www.fixglobal.com.

High Level Overview of Certain Key Regulatory Changes in Risk Management for Electronic Securities Trading in Europe, FTEN a NASDAQ OMX Company, NASDAQ OMX, SMARTS, Dec. 22, 2011, 7 pages.

International Search Report and Written Opinion of the International Searching Authority dated Aug. 11, 2015 in PCT/EP2015/062279, 11 pages.

R. Kuhn et al, "Reactive Design Patterns" Manning Publications, MEAP Edition, Manning Early Access Program, Reactive Design Patterns, Version 1, Mar. 2014, retrieved from http://www.manning.com/kubn/RDP_meap_CH01.pdf Mar. 2014, 48 pages.

Wikipedia, "Business rules engine" May 2014, retrieved from https://en.wikipedia.org/w/index.php?title=Business_rules_engine&oldid=609484387, 4 pages.

* cited by examiner

| Market Maker: [BKR157] | | | | | | | | | |
|---|---|---|---|---|---|---|---|---|---|
| Instrument/Market M... | Status | Percentage Ok Today | Spread | Spread Act | Spread Ob | Volume (B) Act | Volume (B) Ob | Volume (S) Act | Volume (S) Ob |
| SEC1093708 | ok | 24% | | 0.30% | 2.00% | 138,150 | 50,000 | 138,810 | 50,000 |
| BKR157 | 3:29 | 0% | | 0.92% | 2.00% | 39,300 | 50,000 | 138,810 | 50,000 |
| SEC1093715 | ok | 52% | | 0.27% | 2.00% | 2,141,047 | 50,000 | 120,580 | 50,000 |
| BKR157 | 0:55 | 40% | | 0.27% | 2.00% | 120,250 | 50,000 | 120,580 | 50,000 |
| SEC1100791 | ok | 11% | | 0.73% | 3.00% | 397,914 | 30,000 | 12,450 | 30,000 |
| BKR157 | 3:29 | 0% | | 0.97% | 3.00% | 12,330 | 30,000 | 12,450 | 30,000 |
| SEC1212352 | ok | 85% | | 0.15% | 2.00% | 531,296 | 50,000 | 61,650 | 50,000 |
| BKR157 | 1:19 | 0% | | 0.51% | 2.00% | 61,340 | 50,000 | 61,650 | 50,000 |

APPARATUS AND METHODS FOR IMPLEMENTING CHANGED MONITORING CONDITIONS AND/OR REQUIREMENTS USING DYNAMICALLY-MODIFIABLE CONTROL LOGIC

This application is a continuation of U.S. patent application Ser. No. 16/782,249, filed Feb. 5, 2020, which is a continuation of U.S. patent application Ser. No. 15/933,433, filed Mar. 23, 2018 (now U.S. Pat. No. 10,580,073), which is a continuation of U.S. patent application Ser. No. 14/295,541, filed Jun. 4, 2014 (now U.S. Pat. No. 9,947,048), the entire contents of which are hereby incorporated by reference in this application.

BACKGROUND

A market allows buyers and sellers of a specific good or service to interact in order to facilitate an exchange. The price that individuals pay during the transaction may be determined by a number of market factors which are typically strongly influenced by the forces of supply and demand. An example market is a securities trading exchange. Electronic trading on most securities exchanges is governed by rules and regulations designed to ensure the integrity of the market. In order to detect abuse of such rules and regulations, regulators and exchanges typically use some kind of market surveillance system, which may also include some type of risk monitoring. Traditionally, market surveillance is a burdensome and time-consuming activity, and there is a greater focus on computer-implemented, automated controls across risk and surveillance functions.

Market participants, such as stock brokers, are subject to the risk of being in non-compliance with applicable rules and regulations, e.g., securities legislation or exchange rules, and must be responsible for monitoring their own trading activity so as to ensure that their trading activities do not represent a breach of those rules and regulations. Market participants thus also typically require/use computer-implemented market surveillance tools to make sure they are compliant with rules and regulations.

Because modern electronic trading systems must be able to process millions of buy and sell orders in extremely short time periods, traders usually employ very fast and sophisticated technology so they can view consolidated order books in real-time from all exchanges and multilateral trading facilities (MTFs) across multiple security asset classes. Regulatory and exchange surveillance professionals would benefit from the same view of the market as the traders they are monitoring and in the same time frame. To do so, regulatory and exchange surveillance professionals need flexible, robust technology to keep pace with exploding volumes of trading data, ongoing market structure changes, increased market complexity, and with the traders themselves.

It is desirable that surveillance systems incorporate robust monitoring and analysis tools and provide visualizations to simplify the monitoring process and provide clear-cut guidance to potential scenarios of interest. While historical analysis plays a significant role in the surveillance function, real-time control is important to ensure early detection of unusual trading patterns that could be potential breaches of trading rules and practices.

Keeping up with and responding to market participants in real-time is needed in order to maintain market integrity. Evolving market structures introduce new surveillance requirements. Flexibility is also needed to allow easy and fast adjustments to alerts, order handling rules, and other surveillance functions as necessary.

SUMMARY

The technology in this application provides a monitoring system that quickly and cost effectively adapts with the changing monitored environment, e.g., a market, so as to ensure integrity in the monitored environment.

Example embodiments relate to an obligations fulfillment monitoring apparatus, a non-limiting example of which is a surveillance system. One or more communications interfaces receive an input data stream of electronic data messages including transaction data and reference data, obligation computer control logic, and a set of obligation parameters associated with the obligation computer control logic. One or more event data processors, coupled to the one or more communications interfaces, processes the received input data stream of electronic data messages using a current version of the obligation computer control logic and the set of obligation parameters to generate a first electronic obligation fulfillment monitoring status data message. The event data processor(s) receive information to implement and execute obligation computer control logic that is dynamically-modified and different from the current version of the obligation computer control logic. A second electronic obligation fulfillment monitoring data message is generated based on the dynamically-modified obligation computer control logic, stored in an electronic obligations data message memory, and output.

Preferably, the dynamically-modified obligation computer control logic is modifiable in real time without having to install a new version of the dynamically-modified obligation computer control logic in the obligations fulfillment monitoring apparatus.

In example implementations, the obligation fulfillment monitoring data message relates to an entity being monitored, and the reference data corresponds to relatively static data associated with the monitored entity as compared to the set of obligation parameters. For example, the entity may be a market maker, the transaction data includes market transactions, reference data relates to relatively static parameters associated with the market maker, and the input data stream of electronic data messages includes electronic data messages related to orders and quotes input to an automated exchange. The input data stream of electronic data messages may also include electronic data messages related to trades and trading information derived in an automated exchange based on orders and quotes input to the automated exchange.

The event data processor(s) may select the obligation computer control logic for execution based on one or both of the reference data or the set of obligation parameters. The set of obligation parameters may include limits for the obligation computer control logic.

In example implementations, the dynamically-modified obligation computer control logic is based on a domain-specific language (DSL) and includes DSL-based rules.

Example embodiments also relate to a non-transitory computer-readable storage medium storing computer-readable code for monitoring for obligations fulfillment which, when executed by a computer having one or more event data processors, performs functionality that includes:

receiving an input data stream of electronic data messages including transaction data and reference data, obligation computer control logic, and a set of obligation parameters associated with the obligation computer control logic;

processing the received input data stream of electronic data messages using a current version of the obligation computer control logic and the set of obligation parameters to generate a first electronic obligation fulfillment monitoring data message;

receiving information to implement and execute obligation computer control logic that is dynamically-modified and different from the current version of the obligation computer control logic;

generating a second electronic obligation fulfillment monitoring data message based on the dynamically-modified obligation computer control logic;

storing the second electronic obligation fulfillment monitoring data message based on the dynamically-modified obligation computer control logic; and outputting the second electronic obligation fulfillment monitoring message based on the dynamically-modified obligation computer control logic.

Example embodiments further relate to methods for monitoring for obligations fulfillment that include the following steps:

receiving, via a communications interface, an input data stream of electronic data messages including transaction data and reference data, obligation computer control logic, and a set of obligation parameters associated with the obligation computer control logic;

processing, by one or more data event processors, the received input data stream of electronic data messages using a current version of the obligation computer control logic and the set of obligation parameters to generate a first electronic obligation fulfillment monitoring data message;

receiving information to implement and execute obligation computer control logic that is dynamically-modified and different from the current version of the obligation computer control logic;

generating, by the one or more data event processors, a second electronic obligation fulfillment monitoring data message based on the dynamically-modified obligation computer control logic;

storing the second electronic obligation fulfillment monitoring data message based on the dynamically-modified obligation computer control logic; and outputting the second electronic obligation fulfillment monitoring message based on the dynamically-modified obligation computer control logic.

BRIEF DESCRIPTION OF THE DRAWINGS

FIG. 6 shows an electronic visualization or display of some example market maker obligation monitoring statistics;

FIG. 7 shows an electronic visualization or display of an example market maker monitor obligation report.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

Figure 1:
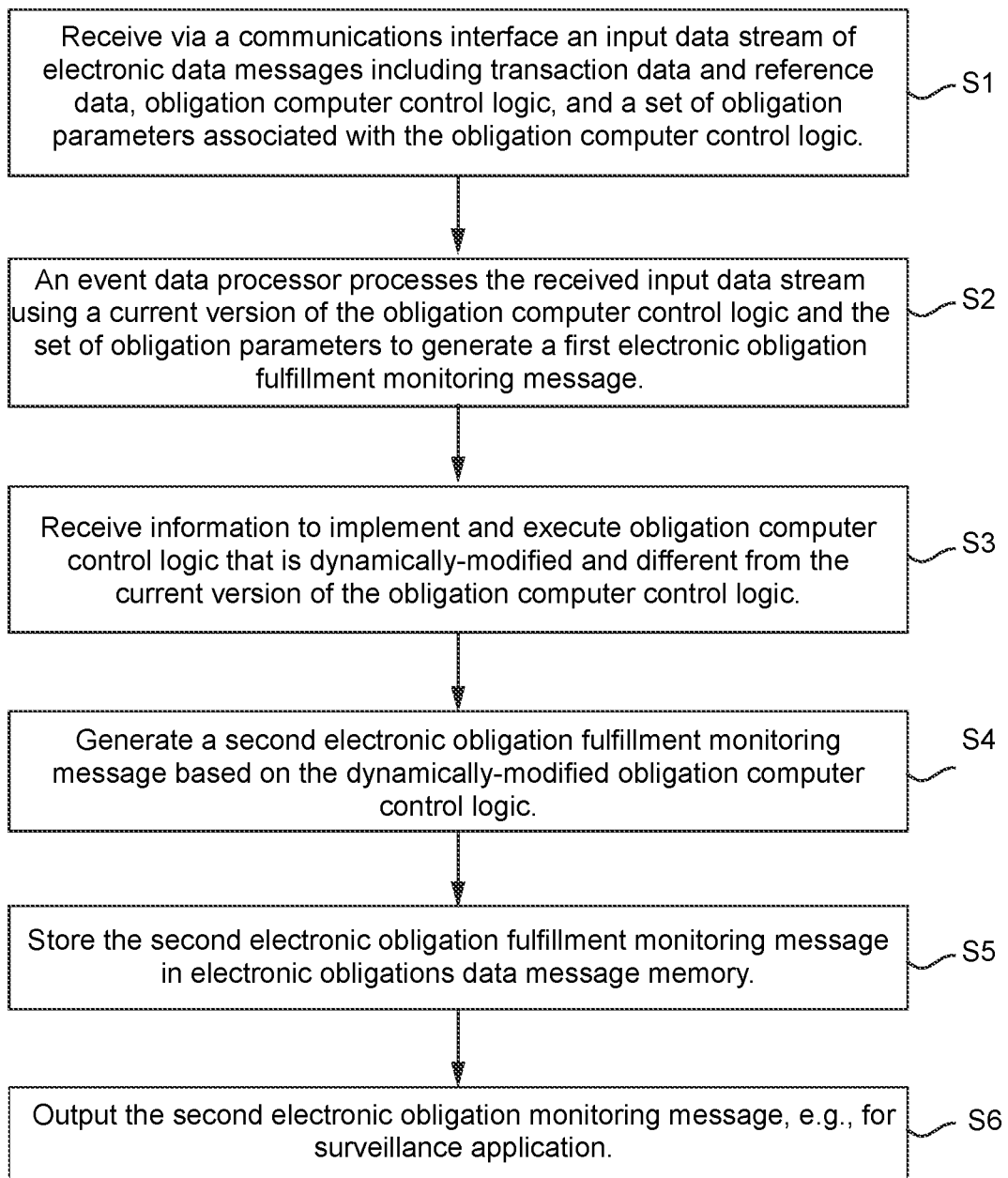
FIG. 1 is an example flowchart describing a process for implementing changed monitoring conditions and/or requirements in a monitoring system using dynamically-modifiable control logic.

FIG. 1 is an example flowchart describing a process for implementing changed monitoring conditions and/or requirements in a monitoring system, e.g., a surveillance system, using dynamically-modifiable control logic. The monitoring system receives, via one or more communications interfaces, an input data stream of electronic data messages including transaction data and reference data, obligation computer control logic, and a set of obligation parameters associated with the obligation computer control logic (step S1). The obligation computer control logic may be for example a sequence of computer control rules such as domain-specific language (DSL) rules. One or more event data processors process the received input data stream using a current version of the obligation computer control logic and the set of obligation parameters and generate a first electronic obligation fulfillment monitoring message based on current obligation computer control logic (step S2). The monitoring system also receives, via one or more communication interfaces, information to implement and execute obligation computer control logic that is dynamically-modified and different from the current version of the obligation computer control logic (step S3). The event processor(s) generate a second electronic obligation fulfillment monitoring message based on the dynamically-modified obligation computer control logic (step S4) and store the second electronic obligation fulfillment monitoring message in electronic obligations data message memory (step S5). The memory may be any type of suitable memory including semiconductor, magnetic, electro-magnetic, optical, biologic, etc. type memories. The electronic obligation monitoring messages are output by the event data processor(s) to the one or more communications interfaces (step S6). The outputting of messages includes any type of message output including but not limited to transmitting, parsing, or submitting. The output messages may be used for example as part of a surveillance application or operation.

Example monitoring systems are described below in a non-limiting context of market surveillance system embodiments to determine whether obligations placed on a market participant, such as a market maker, are met or not. However, market surveillance systems are only an example, and the technology may be employed in any appropriate monitoring system.

NASDAQ OMX provides two example market surveillance systems. One is a SMARTS Integrity market surveillance system, which is a high performance, automated real-time monitoring system designed for operators of capital markets surveillance, e.g., stock exchanges, derivatives exchanges, private regulators and government regulators. One application for the SMARTS Integrity market surveillance system is surveillance of markets in order to detect illegal or manipulative behavior in the market. This is accomplished by searching for patterns of activity and raising alerts. The SMARTS Integrity market surveillance system includes a suite of computer-implemented software modules for performing additional functions including: alert/incident management, alert/scenario maintenance, graphical displays of trading activity, order book replay, data mining, custom report generation and automatic reporting, market replay, market overview and statistical evaluation, and broker/trader activity queries. The other market surveillance system, SMARTS Broker, is for Brokers/Market participants. It is a market surveillance system designed for stock brokers and securities dealers interacting with exchanges. The SMARTS Broker market surveillance system processes market trading data to identify and alert subscribers of nominated patterns of behavior.

One example activity that needs monitoring is market making. A market maker is typically a company, e.g., a broker-dealer firm, or an individual that is obliged to simultaneously quote both a buy price and a sell price (called quotes) in a security, e.g., a financial instrument or commodity, to create a market for other participants and provide liquidity. A market maker accepts the risk of holding a certain number of shares of a particular security in order to facilitate trading in that security. Once an order is received, the market maker immediately sells from its own inventory or seeks an offsetting order.

The SMARTS computer architecture includes computer-implemented application components that perform surveillance and research functionalities on financial data using a data model called MPL that stores market real-time and historic information. Software program modules executed by general purpose computer(s) and/or other data processing circuitry (sometimes called engines) create and process the MPL data, e.g., for tracking and alerting. A domain-specific language (DSL), called the Alice language, is used to specify rules and conditions for the engine functions such as monitoring and alerting functions.

The MPL data model includes transient data held in main memory and persistent data held longer term memory such as disk memory. Real time market transactions are processed as they are received from one or more trading engines and/or other data sources. Example market transactions may relate to trades, orders, quotes, historic indexes, interest rates, dividends, stock splits, static data like company names, shares-on-issue, index weighting, option and futures details, etc. The SMARTS market surveillance system may also store data in a special format called a FAV format for efficient access and storage conditions. A conversion program module generates FAV formatted message from the trading exchange data.

The MPL data model includes a set of application programming interfaces (APIs) that can be invoked from SMARTS application components, C programs, Alice language commands, or the like. The programming language Alice is a non-limiting example of a programming language that may be used for coding and creating rules for monitoring and alerting based on historical and real time transaction data.

Figure 2:
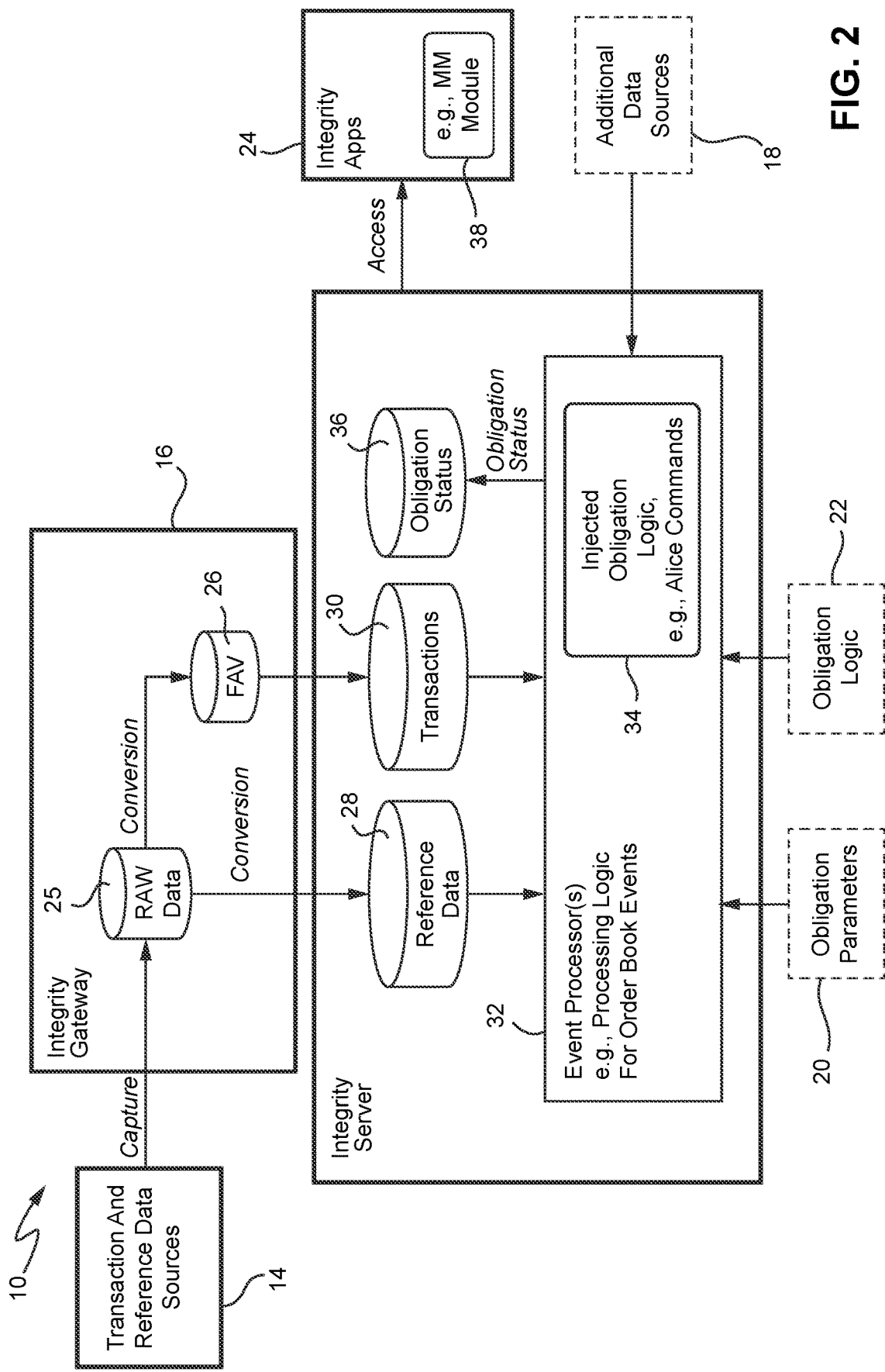
FIG. 2 is a block diagram showing a computer-implemented monitoring system in accordance with a non-limiting, example embodiment.

While the SMARTS market surveillance system provides the ability to monitor market maker obligations in real-time, what is needed and what is provided by the marker maker monitoring technology described in this application is the ability to quickly and flexibly change the underlying rules, logic, and/or program code that define market maker obligations. FIG. 2 is a block diagram showing a computer-implemented monitoring system in accordance with a non-limiting, example embodiment of such technology.

FIG. 2 shows a monitoring system 10 with an integrity computer server 12 receiving input data signals from transaction and reference data sources 14 via an integrity gateway 16 as well as other data sources 18. The integrity gateway 16 stores the data from the transaction and reference data sources 14 in a database 25. The transaction and reference data may optionally be converted into specific data storage and processing formats, such as a FAV format, and saved in that format in FAV database 26. FAV is an example of a normalized representation of order book events that allows the SMARTS system to operate on any order book event stream that has been converted to FAV. The received data may be optionally parsed and then stored in reference data memory 28 and transactions memory 30. The reference data includes relatively static information like the names of securities, brokers, traders, market makers, code, sector, etc., and typically may only need to be stored once or updated infrequently. The transaction data is dynamic information such as trades, quotes, prices, volumes, alerts, news, etc. and is typically high volume, e.g., millions of events per day. The reference data and transaction data may be linked via identifiers and/or codes.

One or more event processors 32 has access to and processes reference and transaction data based on certain processing logic defined to monitor events, e.g., whether or not market makers have fulfilled their obligations as specified by the current processing logic rules. Such obligations are defined by obligation parameter input information 20 and by injected obligation logic rules 22. The term injected is used to describe the input of obligation logic rules 22 and to distinguish from input of data like transactions, reference data, parameters, etc. The monitoring results are stored in obligation status memory 36 and may be transmitted to various entities via one or more communication interfaces (not shown) as output messages to be displayed on a user display, e.g., a front end module such as the integrity application 24, which might include for example a market maker monitoring module 38, or other access path such a SQL for customer reporting. The monitoring results may be used to generate visualization aids (graphs, plots, etc.), summaries, and reports.

As an example, the event processor 32 issues events for each event in the orderbook received from a trading exchange, and the injected, computer-executable obligation logic 34 calculates or otherwise determines the obligation status. The injected obligation logic 34 may or may not use obligation parameters. Typically, monitoring systems, like the SMARTS surveillance system, use fixed parameterized, computer-implemented logic inside the event processor 32. As noted above, such fixed obligation logic constrains the flexibility and adaptability of the system.

For example, a traditional market maker monitoring system may have a computer-implemented logic rule that requires market makers to provide a spread of a certain percentage of the best bid for one or more securities. That percentage is a parameter in the computer-implemented logic rules but is not a computer-implemented logic rule itself. In such a system, the percentage can be varied by changing the value of the parameter, but the computer-implemented logic rules are fixed or static and cannot be so readily changed. To actually change one or more of such rules, a new version of the software code for the obligation logic rules with the change(s) must be generated and installed at significant expense and delay.

In contrast, the monitoring system 10 "injects" or inputs dynamically-changeable obligation logic rules, e.g., DSL program code commands, into the event processor 32. Consider the following situation. For any relevant event on a monitored orderbook, the event processor 32 checks the spread for each monitored market maker and issues the corresponding obligation status for storage at memory 36. A situation arises where there is a desired logic or rule change, which is not the same as a desired parameter change, e.g., change from 2% to 1%. Assume in this example that a change is desired of the market maker obligation rules from "maintain a spread of 2% between the best bid and the best offer for the security" to "maintain a spread of 1% between the best bid and the best offer for the security with a certain minimum volume on both sides." In other words, in addition to the parameter change from 2% to 1%, there is a monitoring logic rule change to include the further monitored condition "with a certain minimum volume on both sides." To effect this monitoring logic rule change in a traditional monitoring system, like the SMARTS surveillance system, a new program code release is required with that new logic rule implemented. In contrast, the market maker monitoring logic is dynamically-changed to check—not just the spread—but also the buy and sell side volumes for the market maker at the required spread and injected into the event processor(s), e.g., using domain specific language. The dynamic change of the logic rule can be made and injected immediately without the need to wait for a new program to be developed and shipped for installation in the monitoring system.

Inputs to the event processor 32 include both market events and associated reference data and the actual event logic processing rules. The event logic processing rules may be for example domain specific language (DSL) commands, and in the SMARTS surveillance system example, they may be DSL-based Alice commands.

Figure 3:
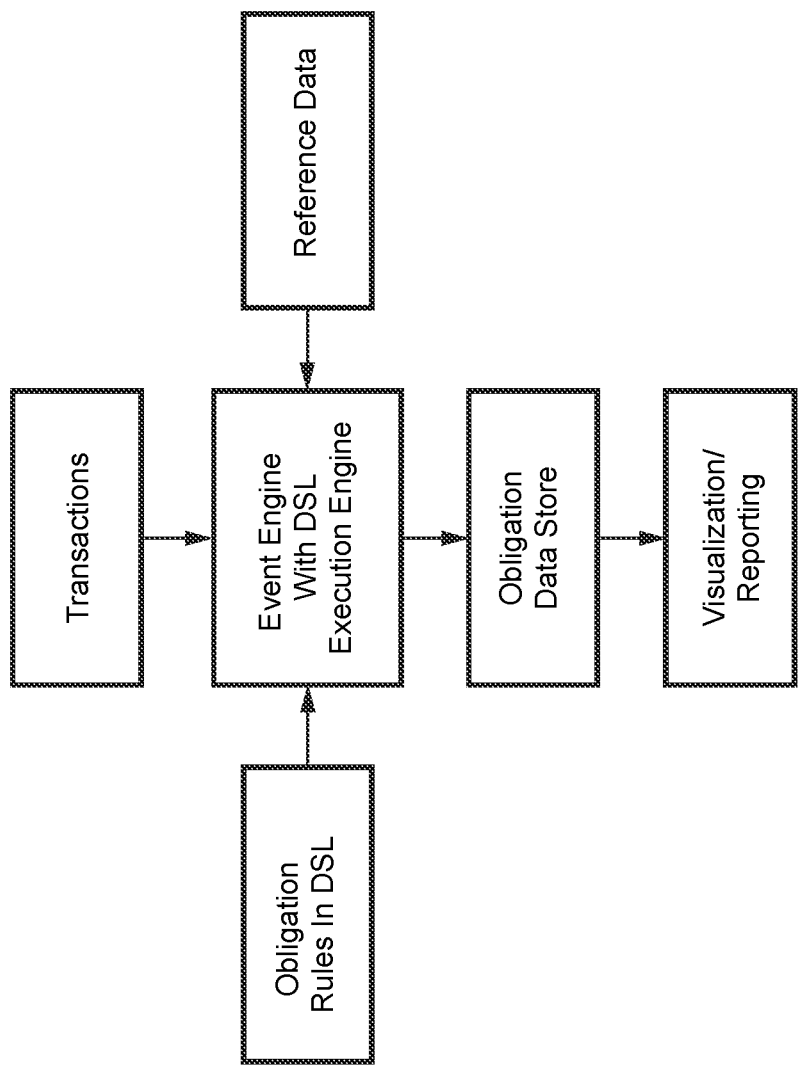
FIG. 3 is an example flow diagram that may be used with the monitoring system in FIG. 2.

FIG. 3 is a flow type diagram that describes one example application of the monitoring system in FIG. 2. The event processor(s), which in this example include one or more domain specific language (DSL) execution engines (e.g., program code executed by one or more data processors), receive as inputs obligation rules as DSL code, rapidly changing market transaction data, and relatively slowly changing or static reference data. The event engine(s) generate and store obligations for market makers for subsequent monitoring for compliance by monitored market makers. The event engine(s), using a domain specific language (DSL), calculate after every event whether market maker obligations are met or not and store that monitoring result as an obligation status. Downstream components use this information for real-time visualization, alerting, and/or reporting.

The dynamically-changeable market maker monitoring logic has a number of advantages including the ability to change obligation rules dynamically, e.g., "on the fly," and without a full software release. Other advantages include the ability to express any obligation rule in a high level language, i.e., without low level programming, readily retrieve real-time status data without re-evaluating rules, and aggregate status data for a period of time without re-evaluating logic rules.

The monitoring system in FIG. 2 may be used monitor market makers for compliance with an exchange's market making requirements. Specific market maker parameters are defined by the exchange and included in one or more monitoring logic rules for market making in a security or set of securities. Example market maker logic rules include quotation type, obligation metrics, and obligation timeouts. The database(s) store the relationships between market makers and a security or a set of securities, and a security may have more than one market maker defined. This is an example of reference data which is relatively static and can be separately stored from the more dynamic transaction data.

Obligation rules also include certain metrics to configure market maker obligations including the quantity of a security that the market maker must offer and the spread within which the market maker must offer that quantity. The market maker may offer more than the obliged amount and that excess may be outside the obligation spread, but there must be at least the minimum obligation within the spread in order for a market maker to fulfill its obligation.

Another monitored parameter example relates to obligation timeouts. When a market maker moves into a breach of its obligations, for example as a result of a match that reduces to zero inventory of a security at the quoted price, a monitoring logic rule may be configured with a delay before an alert is issued for the missing quote for the monitored market maker. This delay gives the market maker a chance to refresh its quotes before any record of the event is recorded in the system.

Figure 4:
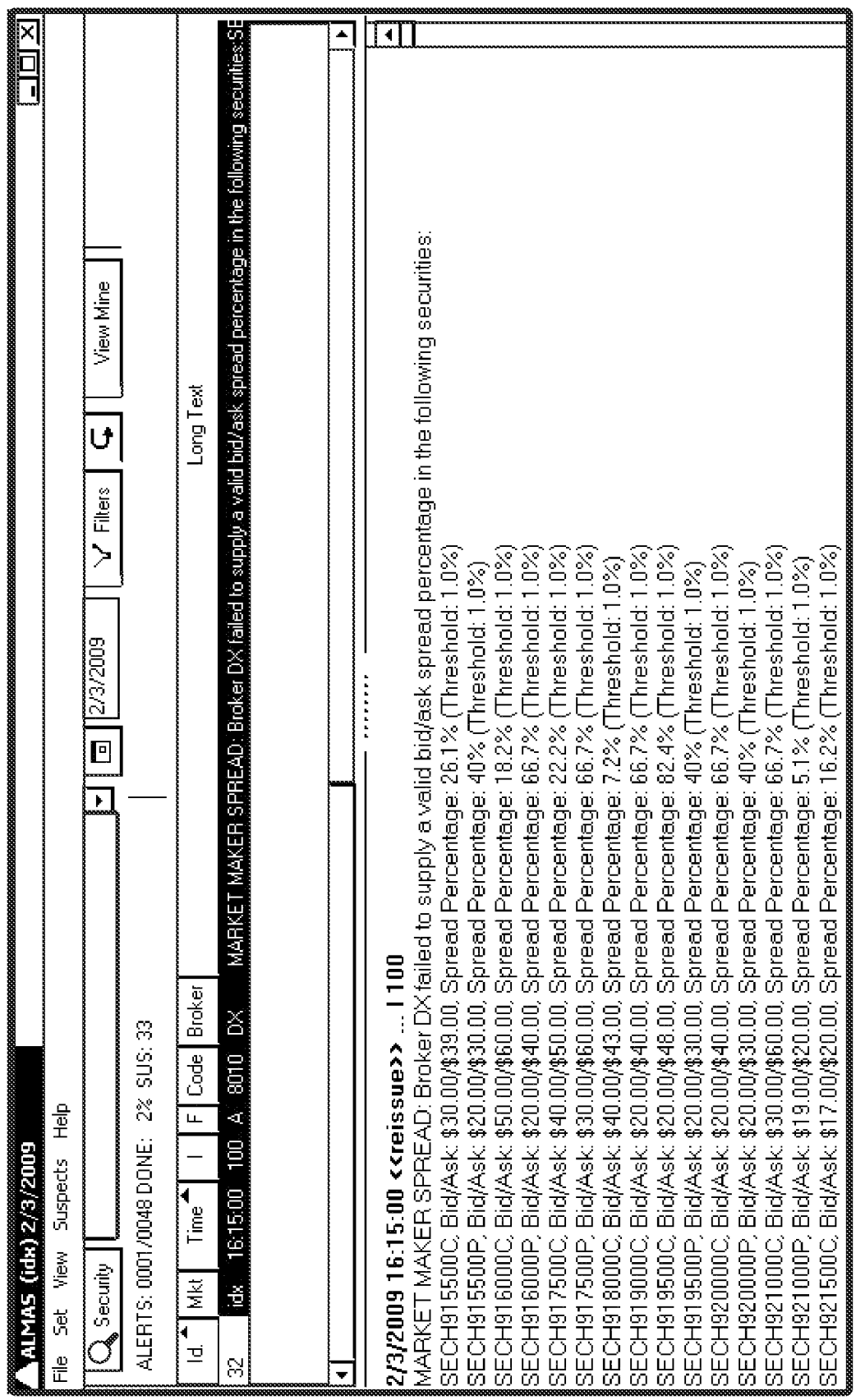
FIG. 4 shows an electronic visualization or display of a market maker spread alert in accordance with a market maker obligation monitoring example.

Ultimately, if a market maker fails to fulfill a monitored obligation, then the market maker is in breach of that obligation. When a breach occurs, the monitoring system generates and transmits sent an alert for display or some other market maker obligation report or message. FIG. 4 shows an electronic visualization or display of a market maker spread alert in accordance with a market maker obligation monitoring example. The alert displays for a market maker DX where the market maker has failed to create an obligated bid and ask spread of 1%.

Figure 5:
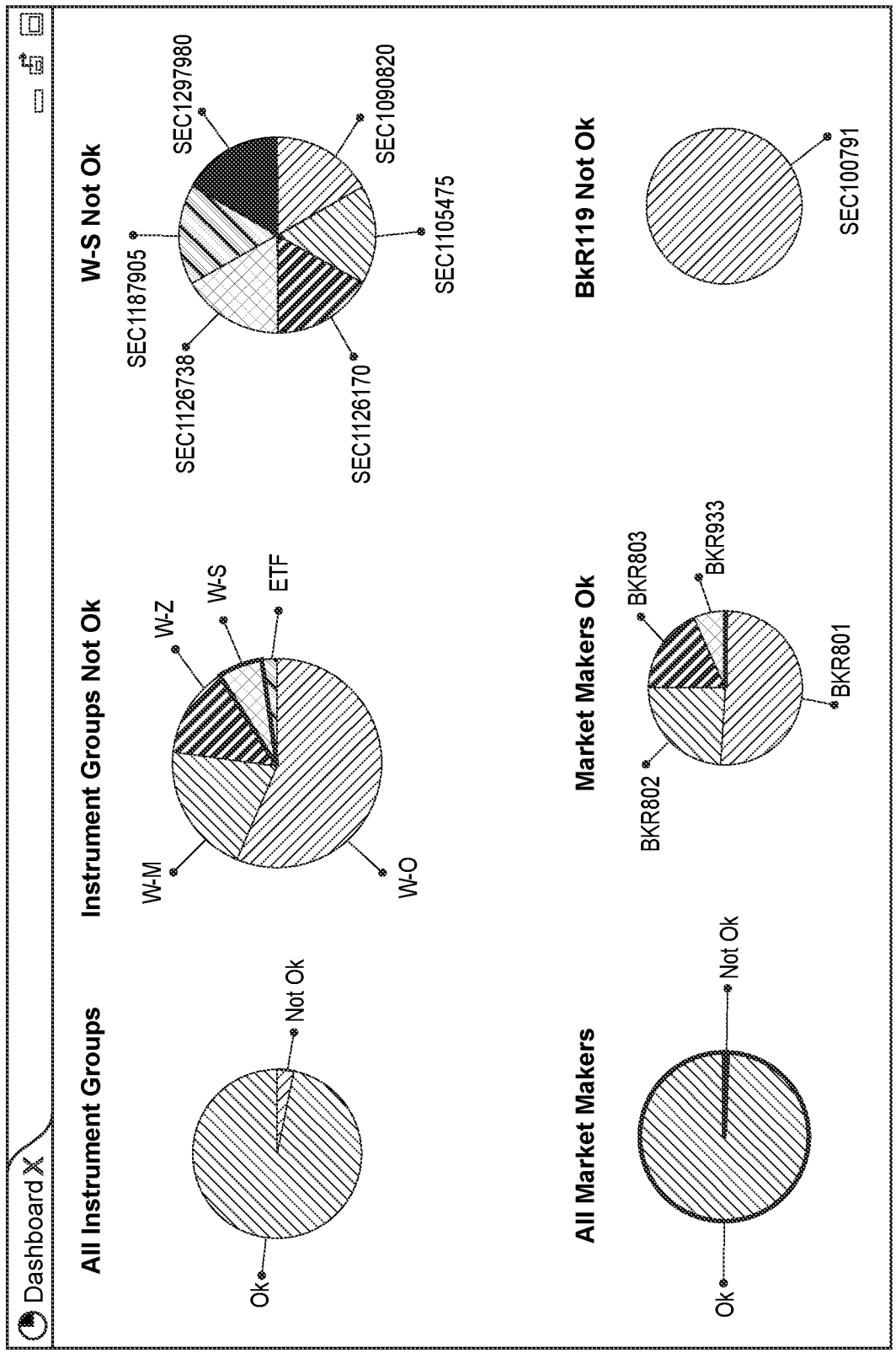
FIG. 5 shows an electronic visualization or display of an obligation monitor dashboard example.

Market maker obligations can be monitored at a glance using a graphical dashboard. Users can review the entire market and drill down interactively into instrument groups or further into individual market makers. FIG. 5 shows an electronic visualization or display of an obligation monitor dashboard example.

Market makers and their required contract spreads and volumes can be filtered and reviewed. Users can select specific point in time to review spread and volume levels supplied by a market maker, and one or more color-coded tables may be used to illustrate obligation commitment. FIG. 6 shows an electronic visualization or display of some example market maker obligation monitoring statistics.

Figure 7:
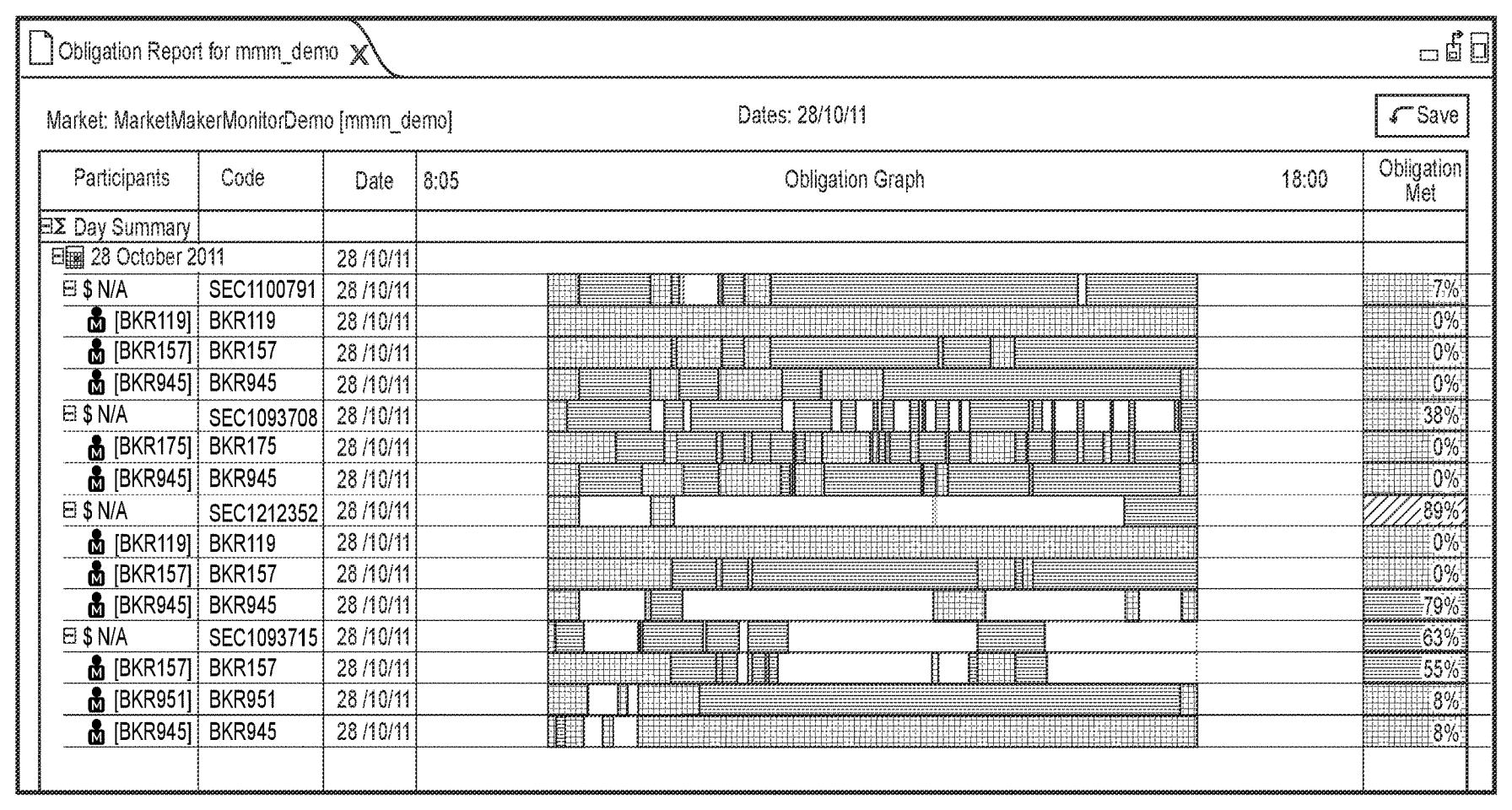

Market maker obligation reports display if commitments have been met. For example, users can select to generate reports combinations of instruments and/or market makers, and the date range. FIG. 7 shows an electronic visualization or display of an example market maker monitor obligation report. Color code obligation report displays time intervals where market making obligations were satisfactory, conditional, or unsatisfactory.

Figure 8:
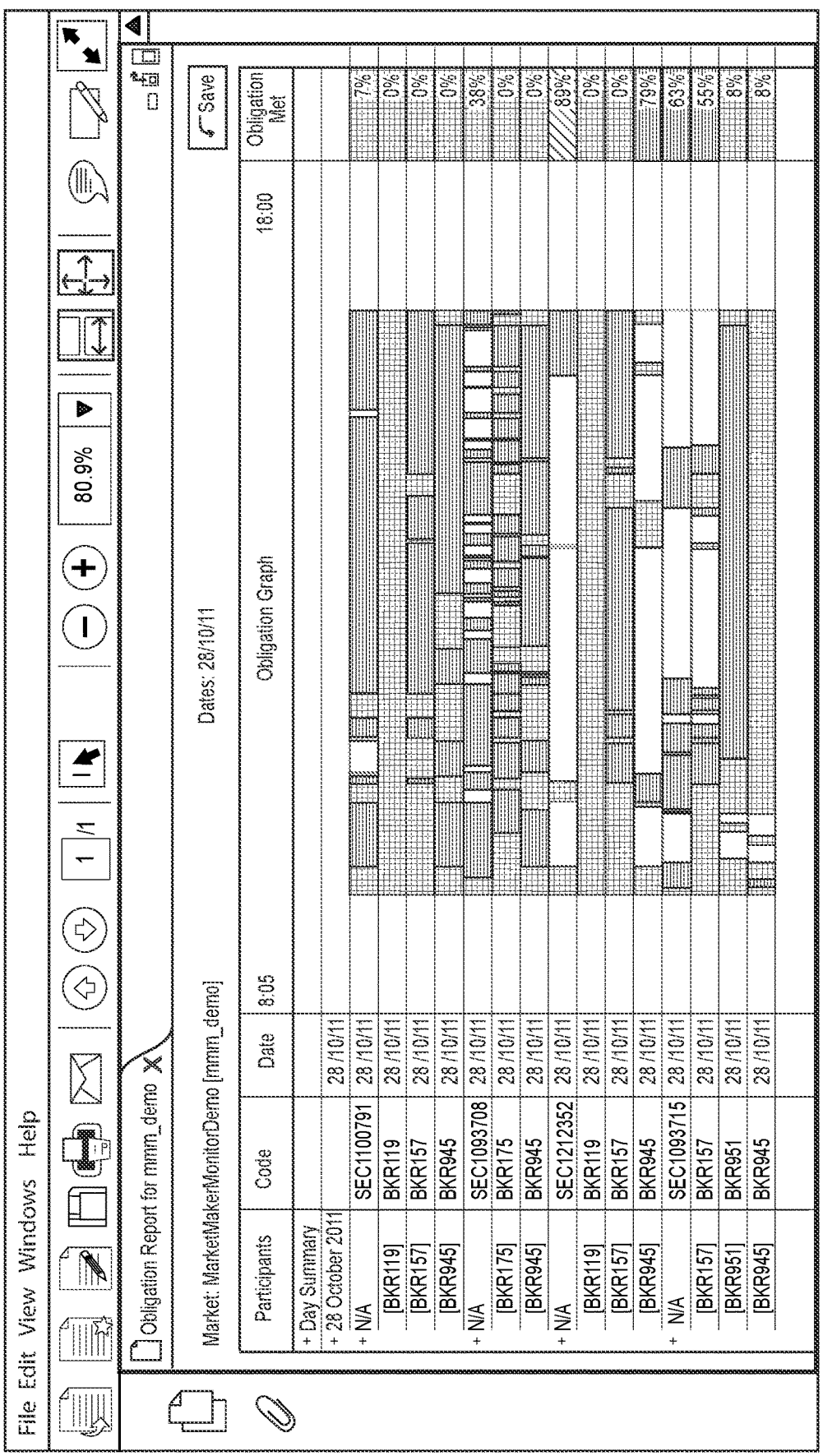
FIG. 8 shows an electronic visualization or display of an example market maker monitor obligation PDF report.

Example market maker monitor obligation reports can be exported to formats such as PDF or CSV for investigations or sent to market makers. FIG. 8 shows an electronic visualization or display of an example market maker monitor obligation PDF report.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present technology, for it to be encompassed by the claims. No embodiment, feature, component, or step in this specification is intended to be dedicated to the public.

The invention claimed is:

1. A computer-implemented monitoring system, comprising:
 a communications interface configured to receive an input data stream of electronic data messages, wherein the communications interface includes hardware; and
 a data processor, capable of communication with the communications interface, wherein the data processor includes processing circuitry and is configured to:
  process the input data stream of electronic data messages using a current set of computer instructions to determine a monitoring status;
  receive information for modifying the current set of computer instructions;
  dynamically modify the current set of computer instructions using the received information by injecting one or more modifying computer instructions into the current set of computer instructions resulting in a modified current set of computer instructions;
  execute the modified current set of computer instructions to generate a new monitoring status; and
  output data that indicates the new monitoring status.

2. The computer-implemented monitoring system of claim 1, wherein the new monitoring status relates to an entity being monitored, and wherein the data processor is configured to execute the modified current set of computer instructions using a set of parameters associated with the entity being monitored.

3. The computer-implemented monitoring system of claim 2, wherein the data processor is configured to execute the modified current set of computer instructions using transactional data associated with the entity being monitored.

4. The computer-implemented monitoring system of claim 3, wherein the set of parameters and the transactional data are linked by one or more identifiers or codes.

5. The computer-implemented monitoring system of claim 3, wherein the data processor is configured, by executing the modified current set of computer instructions and using the set of parameters along with reference data including historical pattern data, to detect an unusual data pattern associated with the transactional data, wherein the new monitoring status corresponds to a new integrity status.

6. The computer-implemented monitoring system of claim 1, wherein the data processor is configured to receive the information for modifying the current set of computer instructions and execute the modified current set of computer instructions in real time while the data processor is processing the input data stream of electronic data messages using the current set of computer instructions.

7. The computer-implemented monitoring system of claim 1, wherein the modified current set of computer instructions includes one or more of the following: one or more condition types, one or more condition metrics, and one or more condition time periods.

8. The computer-implemented monitoring system of claim 1, wherein the modified current set of computer instructions is based on a domain-specific language (DSL).

9. The computer-implemented monitoring system of claim 1, further comprising:
 a graphical user interface to display an electronic visualization of information obtained from the new monitoring status.

10. A non-transitory computer-readable storage medium storing a current set of computer instructions which, when executed by a computer having one or more data processors implemented using processing circuitry, performs functionality comprising:
 receiving an input data stream of electronic data messages via one or more communications interfaces;
 processing the input data stream of electronic data messages using the current set of computer instructions to determine a monitoring status; and
 receiving information for modifying the current set of computer instructions;
 dynamically modifying the current set of computer instructions using the received information by injecting one or more modifying computer instructions into the current set of computer instructions resulting in a modified current set of computer instructions;
 executing the modified current set of computer instructions to generate a new monitoring status; and
 outputting data that indicates the new monitoring status.

11. A method for monitoring, comprising:
 receiving, via one or more hardware communications interfaces, an input data stream of electronic data messages;
 processing, by one or more hardware data processors in communication with the one or more hardware communications interfaces, the input data stream of electronic data messages using a current set of computer instructions to determine a monitoring status;

receiving, by the one or more hardware data processors, information for modifying the current set of computer instructions;

dynamically modifying the current set of computer instructions using the received information by injecting one or more modifying computer instructions into the current set of computer instructions resulting in a modified current set of computer instructions;

executing the modified current set of computer instructions to generate a new monitoring status; and outputting data that indicates the new monitoring status.

12. The method of claim 11, wherein the new monitoring status relates to an entity being monitored, and wherein the method further comprises: executing, by the one or more hardware data processors, the modified current set of computer instructions using a set of parameters associated with the entity being monitored.

13. The method of claim 12, wherein the method further comprises: executing, by the one or more hardware data processors, the modified current set of computer instructions using transactional data associated with the entity being monitored.

14. The method of claim 13, wherein the set of parameters and the transactional data are linked by one or more identifiers or codes.

15. The method of claim 13, wherein the method further comprises: executing, by the one or more hardware data processors, the modified current set of computer instructions and using the set of parameters along with reference data including historical pattern data to detect an unusual data pattern associated with the transactional data, wherein the new monitoring status corresponds to a new integrity status.

16. The method of claim 11, wherein the method further comprises:
receiving the information for modifying the current set of computer instructions, and
executing, by the one or more hardware data processors, the modified current set of computer instructions in real time while the one or more hardware data processors is processing the input data stream of electronic data messages using the current set of computer instructions.

17. The method of claim 11, wherein the modified current set of computer instructions includes one or more of: one or more condition types, one or more condition metrics, and one or more condition time periods.

18. The method of claim 11, wherein the modified current set of computer instructions is based on a domain-specific language (DSL).

19. The method of claim 11, the method further comprising:
displaying an electronic visualization of information obtained from the new monitoring status.

* * * * *